United States Patent
Wiese et al.

[15] 3,671,590
[45] June 20, 1972

[54] PROCESS FOR FORMING CARBONYL COMPOUNDS

[72] Inventors: Herbert K. Wiese, Cranford; Paul E. Burton, Westfield, both of N.J.

[73] Assignee: Esso Research and Engineering Company

[22] Filed: Sept. 9, 1968

[21] Appl. No.: 758,623

Related U.S. Application Data

[63] Continuation-in-part of Ser. No. 376,554, June 19, 1964, abandoned.

[52] U.S. Cl. ......................260/593 R, 260/586 R, 260/598, 260/604 R, 260/566 A, 260/647
[51] Int. Cl. ................C07c 49/04, C07c 45/02, C07c 47/02
[58] Field of Search..................260/593, 586, 594, 604, 598, 260/566 A, 615, 647

[56] References Cited

UNITED STATES PATENTS 2,725,384  11/1955  Burness ................................260/593

OTHER PUBLICATIONS

Adams et al., Organic Reactions, Vol. VII, page 352

*Primary Examiner*—Daniel D. Horwitz
*Attorney*—Chasan and Sinnock and J. E. Luecke

[57] ABSTRACT

A process for the formation of carbonyl compounds and certain new ketone compositions by reacting the appropriate acyclic or alicyclic Type II, III, IV or V olefin with an organic nitrite in the presence of an acid catalyst. The specific end product(s) produced depend upon the starting olefin, type of organic nitrite employed, etc.

16 Claims, No Drawings

PROCESS FOR FORMING CARBONYL COMPOUNDS

This application is a continuation-in-part of Ser. No. 376,554 filed June 19, 1964, now abandoned.

BACKGROUND OF THE INVENTION

This invention is directed to a novel process for preparing carbonyl compounds, viz., ketones and aldehydes, the acetal derivatives thereof, and alkoxy oximino or alkoxy nitroso compounds by reacting the appropriate type of acyclic or alicyclic olefins with an organic nitrite of the formula A-ONO as hereinafter defined, in the presence of an acid catalyst and certain new compositions thus prepared. The specific end product (s) produced will depend upon the specific olefin chosen for the reaction, the type of organic nitrite employed, etc.

More specifically, this invention is directed to a process for preparing carbonyl compounds, e.g. ketones, aldehydes, keto-aldehydes and acetal derivatives thereof, and alkoxy oximino and alkoxy nitroso compounds, by reacting an olefin selected from the group consisting of acyclic and alicyclic Type II, III, IV and V olefins as defined herein with an organic nitrite of the above formula in the presence of an acid catalyst. Instead of employing said organic nitrite, as such, at the outset of the process, the organic nitrite can be prepared in situ during reaction, e.g. by use of the corresponding organic alcohol and N2O3. Alternatively, a metal nitrite plus the corresponding alcohol and an acid can be used to form said organic nitrite in situ.

DESCRIPTION OF THE PRIOR ART

Reactions involving the cleavage of double bonds to carbonyl compounds and a simultaneous double bond addition reaction to form alkoxy oximino and alkoxy nitroso compounds have not been previously reported in the patent literature. The cleavage of double bonds to carbonyl compounds is normally achieved by ozonolysis. The production of oximes, specifically acenaphthenequinone monoxime, has been described in the literature in British Pat. No. 869,855. This British patent discloses a process for the manufacture of acenaphthenequinone monoxime by reacting acenaphthene with dinitrogen trioxide together with air or oxygen or with nitrous acid in an alcohol acid medium. The products of this oxidation-type reaction disclosed in the British reference are a keto group and an oxime group. This type of an oxidation reaction does not involve a cleavage of the double bond but rather an oxidation of the reaction products obtained from the addition of oxides of nitrogen to the olefinic bond.

SUMMARY OF THE INVENTION

Now, in accordance with the present invention, it has been discovered that the double bond of the appropriate acyclic and alicyclic Type II, III, IV and V olefins may be catalytically cleaved with alkyl nitrites in the presence of an acid-type catalyst to carbonyl compounds. During this cleavage reaction a simultaneous double bond addition reaction occurs resulting in the formation of alkoxy nitroso and alkoxy oximino compounds. The organic nitrite employed has the formula A—ONO, wherein A is an alkyl or cycloalkyl radical. Furthermore, the instant process results in the formation of two new compositions of matter, 6,6-dimethoxy-2-hexanone and 7,7-dimethoxy-2-heptanone, which are valuable intermediates in forming bifunctional compounds.

The terms Type II, III, IV and V olefins as employed herein refer to acyclic (aliphatic) and alicyclic (cyclo-paraffinic) olefins. The position and number of substituents of the acyclic and alicyclic Type II, III, IV and V olefins contemplated herein are the same as is indicated by C. E. Boord, *The Science of Petroleum* Volume 2, page 1349 et seq., Oxford University Press, New York (1938). The definition of the acyclic and alicyclic Type II, III, IV and V olefins is given hereinbelow.

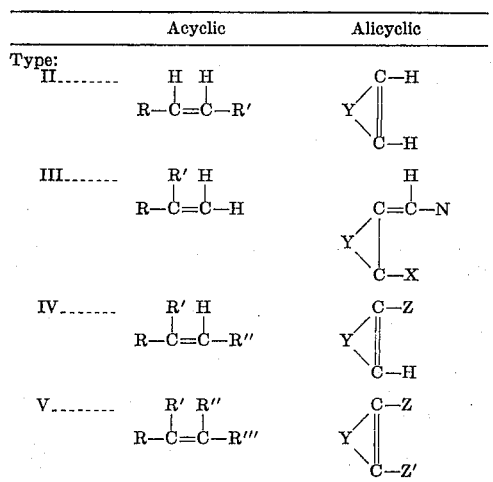

The acyclic olefins described above contain from four to about 21 carbon atoms wherein R, R', R" and R''' may each be the same or different substituents selected from the group consisting of: alkyl, alkenyl, cycloalkyl and cycloalkenyl radicals. The R, R', R" and R''' substituents themselves can be unsubstituted or substituted with non-functional substituents viz., possess substituents which are inert to the reactions contemplated according to the process of this invention. Preferably, the starting acyclic Type II, III, IV and V olefins contain from four to about 14 carbon atoms.

More preferably, when the acyclic Type II and Type III olefins are employed, R and R' may each be selected from the group consisting of $C_1$ to $C_{12}$ alkyl, alkenyl, cycloalkyl and cycloalkenyl radicals. Most preferably, the sum of R and R' does not exceed 12 carbon atoms when R and R' are each selected from the group consisting of alkyl and cycloalkyl radicals.

When the acyclic Type IV olefin is employed in accordance with the instant process, R, R' and R" are each selected from the group consisting of $C_1$ to $C_{11}$ alkyl, alkenyl, cycloalkyl and cycloalkenyl radicals. Most preferably, the sum of R, R' and R" does not exceed 12 carbon atoms. Lastly, when the acyclic Type V olefin is employed in accordance with the process of the instant invention, R, R', R" and R''' may each be selected from the group consisting of $C_1$ to $C_{10}$ alkyl, alkenyl, cycloalkyl and cycloalkenyl. Most preferably, the sum of R, R', R" and R''' does not exceed 12 carbon atoms.

When one or more of the R, R', R" and R''' groups is alkyl, the alkyl group can be a straight or branched chain group. Moreover, the alkyl group(s) can contain a cycloalkyl moiety in addition to its straight or branched chain moiety.

In the alicyclic Type II, III, IV and V olefins, the Y group represents the remaining part of the mono or polycyclic ring system. For example, in 1-methyl-1-cyclohexene, the Y group is $(CH_2)_4$. The Y group can contain from three to about 10 carbon atoms for a monocyclic ring system, and from five to about 10 carbon atoms for a polycyclic ring system. More preferably, for a monocyclic ring system, the Y group is represented by the following general formula:

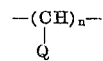

wherein $n$ ranges from three to about 10 and wherein Q may be selected from the group consisting of hydrogen or a $C_1$ to $C_6$ alkyl, $C_1$ to $C_6$ alkenyl, $C_5$ to $C_6$ cycloalkyl or $C_5$ to $C_6$ cycloalkenyl radical. The X substituent of the monocyclic and polycyclic Type III olefins is selected from the group consisting of hydrogen and $C_1$ to $C_5$ alkyl groups. The Z and Z' substituents of the monocyclic and polycyclic Type IV and Type V olefins are the same as defined hereinabove for Q.

The following Type II, III, IV and V olefins can be cited as exemplary of those which can be employed in accordance with this invention. These olefins include, but are not limited to the following:

Acyclic Type II olefins such as: cis- and trans- 2-butene, cis- and trans-2-pentene, 4-methyl-2-pentene, 4-ethyl-2-heptene, 2-dodecene, 2-pentadecene 1,3-pentadiene, 1,4-hexadiene, 2,4-hexadiene.

Alicyclic Type II olefins such as cyclohexene, cyclopentene, cyclododecene, dicyclopentadiene, dihydrodicyclopentadiene, cyclooctene, 1,5-cyclododecadiene, 1,5,9-cyclododecatriene.

Acyclic Type III olefins such as 2-methyl propene, 2-methyl-1-butene, 2-ethyl-1-butene, 2-n propyl-1-butene, 2,4,4-trimethyl-1-pentene, 2-methyl-1,3-butadiene.

Alicyclic Type III olefins such as methylene cyclohexane, methylene cyclopentane.

Acyclic Type IV olefins such as 2-methyl-2-butene, 2-methyl-2-pentene, 3-methyl-3-pentene, 2,6-dimethyl-2,6-octadiene.

Alicyclic Type IV olefins such as 1-methyl-1-cyclohexene, 1-methyl-1-cyclopentene, 1,3-dimethyl-1,3-cyclohexadiene.

Acyclic Type V olefins such as 2,3-dimethyl-2-pentene 2,3-dimethyl-2-butene and 2-methyl-3-ethyl-2-butene.

Alicyclic Type V olefins such as 1,2-dimethyl-1-cyclohexene and 1,2-dimethyl-1-cyclopentene.

Polycyclic Type II olefins such as dicyclopentadiene, norbornene, methyl norbornene.

Polycyclic Type III olefins such as camphene, 2-methylene norbornene, B-selinene.

Polycyclic Type IV olefins such as methylcyclopentadiene dimer, alpha pinene, 2-methyl-bicyclo (2,2,1) heptene-2.

Also olefin derivatives can be employed which form Type II, III, IV or V olefins under the acidic reaction conditions employed herein, and thus the olefin can be formed in situ. For example, tertiary ethers or alcohols derived from Type III, IV or V olefins are converted under acidic conditions to unsaturated hydrocarbons, e.g. according to the following equation.

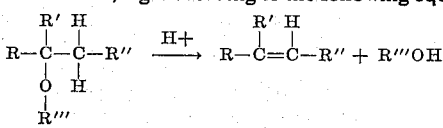

The organic nitrites whose use is contemplated herein are organic nitrites of the formula: A-ONO wherein A is an organic radical selected from the group consisting of primary, secondary and tertiary alkyl and cycloalkyl radicals. In addition to containing hydrogen and carbon, the A radical can also contain oxygen, halogen and sulfur as inert substituents. When A is an alkyl radical, the alkyl moiety can be either straight chain or branched chain. The organic nitrites can contain from one to about 10 carbon atoms. More preferably, the organic nitrite employed in accordance with the process of the instant invention is a $C_1$ to $C_6$ primary, secondary or tertiary alkyl or cycloalkyl nitrite having the formula disclosed above. Most preferably, the organic nitrite of the instant process is a $C_1$ to $C_5$ primary, secondary or tertiary alkyl nitrite or a $C_5$ to $C_8$ cycloalkyl nitrite having the above-described formula.

As suitable exemplary organic nitrites for use in accordance with this invention, the following can be named. These organic nitrites include, but are not limited to, the following: methyl nitrite, isoamyl nitrite, ethyl nitrite, sec.-butyl nitrite, cyclohexyl nitrite, isopropyl nitrite, benzyl nitrite, tert-butyl nitrite, ethylene glycol mono and dinitrite, cyclopentyl nitrite. More preferably, the organic nitrites which can be employed in the process of the instant invention include: methyl nitrite, isoamyl nitrite, ethyl nitrite, isopropyl nitrite.

In accordance with the process of this invention, any non oxidizing acid catalyst can be employed including acids classified as Lewis acids or Brönsted acids. Suitable exemplary acids which can be employed in accordance with this invention include, but are not limited to, the following: sulfuric acid; alkyl acid sulfates, e.g., methyl hydrogen sulfate; potassium bisulfate; HF; trifluoroacetic acid; e.g., methyl hydrogen sulfate plus HI; sulfonated resins, e.g., sulfonated polystyrene resin; benzene mono-, di-, and tri-sulfonic acids; alkylated-, halogenated-, or nitrated-benzene sulfonic acids; zinc chloride; zinc bromide; zinc iodide; hydrochloric acid; hydrobromic acid; phosphoric acid; polyphosphoric acid; alkyl acid sulfates plus alkyl alkali metal sulfates, e.g., methyl hydrogen sulfate plus methyl sodium sulfate; $AlCl_3$; $BF_3$; $BCl_3$; $BF_3 \cdot (C_{25})_2O$; $HF + BF_3$; $SbF_5$; $SnF_4$; HCl plus $AlCl_3$; $SnF_4$ + HF; $FeCl_3$; acidic mixtures containing any two or more of the above mentioned acids; etc. Preferably, the acidic reagents which are employed in the instant invention include sulfuric acid; alkyl acid sulfates, such as methyl hydrogen sulfate, and $BF_3 \cdot (C_aH_5)_2O$. The amount of acid reagent employed in the instant invention ranges from about 0.1 to 25.0 mole percent based on the amount of organic nitrite employed.

The reactions contemplated herein can be illustrated typically by reference to the reaction of a Type IV aliphatic olefin with an alkyl nitrite as in Equations 1 and 2 below:

Equation 1

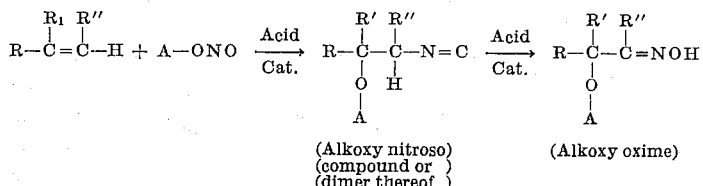

The alkoxy nitroso derivative and dimer thereof is an intermediate in the production of an alkoxy oxime derivative. However, depending on the type of acid catalyst and olefin used, it is possible in some cases to isolate appreciable amounts of the alkoxy nitroso derivative. With most acid catalysts, however, very little if any of the alkoxy nitroso compound can be isolated because the rearrangement of a nitroso group to an oxime group is a very facile reaction and generally is catalyzed by most of the catalysts used to bring about the addition of an alkyl nitrite to the double bond.

Equation 2

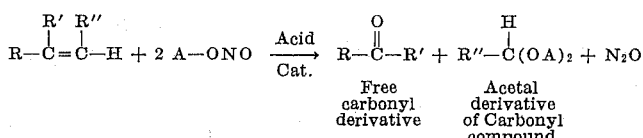

The particular carbonyl compound which will be present in the reaction mixture in the form of free carbonyl or acetal derivative will depend on the following equilibrium reaction:

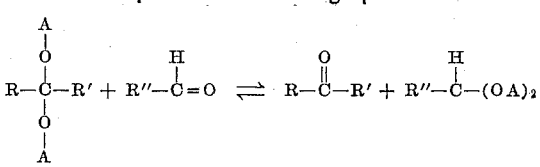

That is, if both an aldehyde and a ketone are formed in the reaction, the aldehyde will usually be present in the form of an acetal derivative because aldehyde acetals are generally more stable than ketals. If two different ketones are formed, the extent to which each ketone is converted to an acetal derivative, i.e., ketal will depend on the above equilibrium reaction. The presence of water in the reaction mixture can completely prevent or reduce the formation of acetal derivatives because of a second equilibrium reaction.

$$R''CH(OA)_2 + H_2O \rightleftharpoons R''CHO + 2 AOH$$

As noted from Equations 1 and 2 above, the main products of reaction for a Type IV olefin and an alkyl nitrite are the

ketone, the A dialkoxy acetal derivative of the R'' aldehyde (both of which are produced by cleavage of the olefin) and the alkoxy oximino compound (alkoxy oxime), which is an addition product of the olefin and the alkyl nitrite. As explained under Equation 2, side reactions can take place yielding the R'' aldehyde and A alcohol; but these usually react to form the more stable acetal derivative and most of the R'' aldehyde produced by olefin cleavage shows up as R'' aldoacetal. Also rearrangement (as explained under Equation 1) can be expected to and does take place between the alkoxy nitroso and alkoxy oxime forms of the addition product. Usually most of the addition product turns up as the alkoxy oxime as this form is generally more stable than the alkoxy nitroso isomeric compound. However, the tendency to form stable addition products, as between alkoxy oximes and the corresponding alkoxy nitroso compounds, varied depending upon the specific olefin, catalyst, and conditions of the process.

Furthermore, the production of alkoxy oximino compounds can serve as a route for making valuable bifunctional compounds, such as unsaturated oximes, unsaturated ketones and unsaturated acids. For example the methoxy oxime produced from isobutylene (Type III olefin) and methyl nitrite in the presence of an acid catalyst can be converted into methacrylic acid by sequential oxidation and heating. In similar manner the methoxy oxime of 2-methyl-2-butene (Type IV olefin) can be converted to the corresponding unsaturated oxime by demethoxylation. In turn this unsaturated oxime can be converted to isopropenyl methyl ketone by sequential hydrolysis (or oxidation) followed by heating.

In the process of this invention some olefin cleavage is always observed accompanied by some addition reaction of olefin and alkyl nitrite. When Type V olefins are employed, e.g. with primary or secondary alkyl nitrites, no alkoxy oxime derivatives are expected. However, they sometimes occur possibly due to double bond shifting prior to addition in which case the olefin is changed from Type V to either Type III or Type IV depending on which way the double bond shifts and the specific Type V olefin employed.

However, the yield of cleavage product(s) compared to addition compound(s) based on total yield of both types of reaction products can range from 10 percent of the former and 90 per cent of the latter to 90 percent of the former and 10 percent of the latter (on a mole percent basis based on olefin reacted) depending upon the specific olefin, and alkyl nitrite reacted. The experimental observations in this regard have yielded surprising results in that it is difficult to predict from the type (viz., Type II, III, IV and V) and structure of the olefin and organic nitrite whether cleavage or addition will predominate.

For example, when reacted with methyl nitrite in the presence of an acid catalyst in methanol (as inert solvent) 2-methyl-2-butene gives about 50 percent double bond cleavage to acetone and acetaldehyde and 50 percent double bond addition to the methoxy oxime. When the same reaction is run only using 2-methyl-2-pentene as the olefin, the resulting conversion is 80 percent to double bond cleavage (acetone and propionaldehyde) and 20 percent to double bond addition. This curious phenomenon occurs even though both olefins are of the same Type (Type IV) and the only structural difference resides in the presence of a methyl group versus an ethyl group as one of the substituents.

Type V, olefins are catalytically cleaved essentially to ketones, with practically no aldehydes being produced. An interesting point, however, is that approximately 50 percent of the ketone formed is isolated in the form of the dialkyl acetal derivative(s) thereof, viz., the ketoacetal(s). Another interesting phenomenon observed is that the acid catalyzed reaction of Type V olefins with "primary and secondary" alkyl nitrites results in the production of small amounts of double bond addition products (alkoxy oxime and/or alkoxy nitroso compounds). These may result, as noted above, from an alkyl group shifting or from a double bond isomerization prior to reaction of the olefin with an alkyl nitrite.

Type II olefins are catalytically cleaved to aldehydes with essentially no ketones being produced. The aldoacetal derivative(s) are produced along with an alkoxy nitroso or its rearrangement isomer, the corresponding alkoxy oxime compound with either a primary, secondary or tertiary alkyl nitrite.

Type III and Type IV olefins yield one ketone and one aldehyde ( and its aldoacetal derivative). One addition product (viz. alkoxy oxime or alkoxy nitroso-compound) results when a primary or secondary alkyl nitrite is employed in the process of the instant invention.

The reactants and reaction products secured from the various types of olefins and alkyl nitrites in acid catalyzed reaction as contemplated herein are summarized in the following table.

TABLE I

| Reactants | | Reaction products | | | | |
|---|---|---|---|---|---|---|
| Olefin | Alkyl nitrite | Ketone | Aldehyde and alcohol [1] | Acetal | Alkoxy oxime [2] | Alkoxy nitroso |
| Type II olefin | Primary alkyl nitrite | No | Yes (two) | Yes (two) (aldoacetals) | Yes (two) | Yes (two). |
| Do | Secondary alkyl nitrite | No | do | do | do | Do. |
| Do | Tertiary alkyl nitrite | No | do | do | do | Do. |
| Type III olefin | Primary alkyl nitrite | Yes (one) | Yes (one) | Yes (one) (aldoacetal) | Yes (one) | Yes (one). |
| Do | Secondary alkyl nitrite | do | do | do | do | Do. |
| Do | Tertiary alkyl nitrite | do | do | do | No [3] | No.[3] |
| Type IV olefin | Primary alkyl nitrite | do | do | do | Yes (one) | Yes (one). |
| Do | Secondary alkyl nitrite | do | do | do | do | Do. |
| Do | Tertiary alkyl nitrite | do | do | do | No [3] | No.[3] |
| Type V olefin | Primary alkyl nitrite | Yes (two) | No | Yes (two) (ketoacetals)** | Yes (one)* | Yes (one).* |
| Do | Secondary alkyl nitrite | do | No | do.* | do.* | Do.* |
| Do | Tertiary alkyl nitrite | do | No | do.** | No [3] | No.[3] |

*May be an alkoxy oxime or alkoxy nitroso compound of a Type IV olefin produced by alkyl group shifting or double bond isomerization caused by the acid catalyst before reaction of olefin with alkyl nitrite.

**An interesting point is that about 50 percent of the ketone(s) formed during cleavage of tetra-substituted (Type V) olefins is isolated in the form of the acetal derivative(s) with the dialkoxy moieties being derived from the alkyl nitrite. This represents a new way of making acetal derivatives of simple ketones, e.g. dimethyl acetal derivatives of simple ketones. Prior art methods of preparing such dimethyl acetal derivatives involve the use of orthoformic esters or acetylenes, both of which are very expensive.

(1) Alcohol will be formed only if water is present in the reaction mixture, or if it is added after the reaction is over or formed during the reaction.

(2) It is possible in some cases that an alkoxy carbonyl compound, viz. an alkoxy aldehyde or an alkoxy ketone will be formed resulting from the reaction of the alkoxy oxime with the alkyl nitrite used to react with the olefin.

(3) The oxime or nitroso derivative consists of a hydroxy oxime and/or hydroxy nitroso compound. In addition, an unsaturated oxime can also be produced, for example, from isobutylene one can obtain methacrolein oxime or a polymer thereof, and from 2-methyl-2-butene one can obtain isopropenyl methyl ketoxime.

Thus carbonyl compounds, e.g., ketones, aldehydes, ketoaldehydes, and acetal derivatives of the ketones, aldehydes and ketoaldehydes and mixtures thereof can be prepared readily in accordance with this invention. The carbonyl compounds which can be prepared in accordance with this invention are carbonyl compounds selected from the group consisting of:
1. ketone compounds having at least one carbonyl group,
2. aldehyde compounds having at least one aldehyde group,
3. ketoaldehyde compounds having at least one carbonyl group and at least one aldehyde group,
4. acetal derivatives of (1), (2) and (3), and
5. mixtures containing at least two of (1), (2), (3) and (4).

A preferred class of acetals which can be prepared in accordance with this invention are acetal derivatives of the formula:

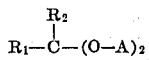

wherein $R_1$ and $R_2$ are each selected from the group consisting of hydrogen or $C_1$ to $C_{12}$ alkyl or ketoalkyl groups, and A is an organic radical as defined hereinabove with respect to the organic nitrite.

Moreover, oximino compounds and nitroso compounds are prepared. Preferred classes of oximino and nitroso compounds, respectively, prepared in accordance with this invention are oximino compounds of the formulas:

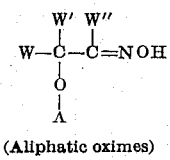 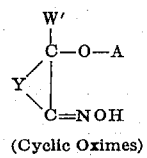

(Aliphatic oximes)  (Cyclic Oximes)

and nitroso compounds of the formulas:

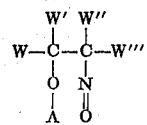 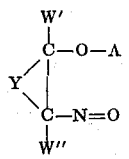

(Aliphatic nitroso compounds)  (Cyclic nitroso compounds)

wherein W is a $C_1$ to $C_{12}$ alkyl radical and W′, W″ and W‴

TABLE 1

| Olefin | | | Nitrite charged, moles | Temperature, °C | Time, hours | Catalyst, methyl hydrogen sulfate, moles | Cleavage product(s) | | Addition product(s) | |
|---|---|---|---|---|---|---|---|---|---|---|
| Name | Amount, moles | Type | | | | | Compound | Amount, moles | Compound | Amount, moles |
| Dicyclopentadiene | 2.3 | II | ¹ 1.0 | 25–32 | 4 | 0.13 | Dialdehyde | (²) | Methoxy oxime | (²) |
| Octene-2 | 2.0 | II | ¹ ³ 0.6 | 25–35 | 4 | 0.13 | Free carbonyl | ⁴ 0.1 | Ethoxy oxime | ⁴ 0.006 |
| | | | | | | | Acetal derivative | ⁴ 0.18 | | |
| 2-methyl-1-butene | 1.7 | III | ¹ 0.66 | 23 | 6 | 0.13 | 2-butanone | (⁵) | | |
| | | | | | | | Methylal | (⁵) | CH₃—CH₂—C(CH₃)(O-CH₃)—CH=NOH | (⁵) |
| 2-methyl-2-butene | 1.67 | IV | ¹ 1.0 | 33–43 | 10 | 0.13 | Acetone | 0.41 | CH₃—C(CH₃)—C(=NOH)—CH₃ | 0.52 |
| | | | | | | | 1,1-dimethoxy ethane | 0.54 | | |
| 1-methyl-1-cyclohexene | 2.0 | IV | ¹ 1.8 | 28–33 | 5 | 0.13 | *7,7-dimethoxy-2-heptanone | 0.37 | *2-methoxy-2-methyl cyclohexanone oxime | 0.46 |
| 1-methyl-1-cyclopentene | 1.5 | IV | ¹ 1.1 | 23–27 | 6.5 | 0.22 | *6,6-dimethoxy-2-hexanone | 0.4 | *2-methoxy-2-methyl cyclopentanone oxime | 0.15 |
| 2,3-dimethyl-2-pentene | 0.75 | V | ⁶ 1.25 | 22–30 | 6 | 0.08 | Acetone | ⁷ 0.35 | C₇ methoxy oxime (structure not known) | ⁸ 0.03 |
| | | | | | | | 2-butanone | ⁷ 0.35 | | |

(1) 350 ml. methanol as solvent.
(2) Exact structure of compounds not identified.
(3) Ethyl nitrite. 430 ml. ethanol as solvent.
(4) Structure of compounds not identified.
(5) Compounds identified, but total amount of each compound formed not determined.
(6) 210 ml. methanol as solvent.
(7) 75% of acetone recovered in the form of dimethyl acetal and 25% of 2-butanone recovered as dimethyl acetal.

* 7,7-dimethoxy-2-heptanone and 6,6-dimethoxy-2-hexanone are new compounds of matter and can be used as solvents for vinyl resins. In addition, due to the fact that the methoxy group is located on the terminal carbon atom in the above-identified new compositions of matter, this allows these compositions to be a valuable route to bifunctional compounds. For example, 7,7-dimethoxy-2-heptanone can be oxidized with nitric acid to a mixture of adipic and glutaric acid. 7,7-dimethoxy-2-heptanone and 6,6-dimethoxy-2-hexanone can be hydrogenated under acidic conditions to produce 1,6-dihydroxy heptane and 1,5-dihydroxy hexane respectively.

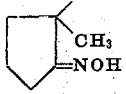 (2-methoxy-2-methyl cyclopentanone oxime) is also a new compound and can be used for making methoxy methyl cyclopentanone by acid hydrolysis of the oxime, Methoxy methyl cyclopentanone can be used as a solvent for vinyl and epoxy resisns.

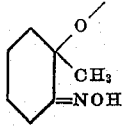 (2-methoxy-2-methyl cyclohexanone oxime) is a new compound which can be used to make the corresponding methoxy ketone, which is useful as a solvent for vinyl and epoxy resins.

are substituents selected from the group consisting of hydrogen and $C_1$ to $C_{12}$ alkyl groups, A is an organic radical as defined hereinabove with respect to the organic nitrite, and Y is the remaining part of a monocyclic or polycyclic ring system as defined hereinabove with respect to cyclic Type II, III, IV and V olefins.

While no solvent need be employed in conducting the reactions contemplated herein, it is usually desirable to employ an inert solvent. A wide variety of suitable inert solvents can by employed in accordance with this invention. Suitable exemplary inert solvents include, but are not limited to the following: methanol; diethyl ether; isoamyl alcohol; water; liquid $SO_2$; tertiary butyl alcohol; tertiary butyl alcohol plus water; ethyl alcohol; n-pentane; isopentanol; n-pentane plus methanol; n-pentane plus an ether such as tetrahydrofuran, diethyl ether and others; polyhydroxy compounds, such as ethylene glycols, etc.

The reactions contemplated herein can be conducted at temperatures of from about $-30°$ to about $250°$ C. at pressures ranging from subatmospheric (0.1 atmospheres) to superatmospheric (300 atmospheres) for time periods ranging from 1 minute to about 20 hours. Usually, however, the reactions will be conducted at temperatures ranging from $-15°$ to $150°$ C. and pressures ranging from 0.5 to 100 atmospheres for time periods ranging from 5 minutes to about 15 hours. Frequently, it is desirable to conduct these reactions at temperatures ranging from $0°$ to $100°$ C. using pressures ranging from 1 to 50 atmospheres for reaction periods ranging from about 10 minutes to about 10 hours. Satisfactory results are obtained using autogenous pressure, viz., atmospheric pressure plus the pressure due to reaction.

The present invention will be illustrated in greater detail in the following examples.

EXAMPLE 1

(Reaction of Types II, III, IV and V olefins with a typical alkyl nitrite).

The below indicated olefins (representative of Types II, III, IV and V olefins) are reacted in separate stainless steel or glass vessels at atmospheric pressures at the temperatures and for the time periods shown below with methyl nitrite employing methanol as solvent and using the below indicated catalysts, respectively, to produce the cleavage and addition products listed in Table I. The identity of the cleavage and the addition products is established by the customary identification procedures, viz., distillation followed by analysis of the various fractions by using a combination of infrared, gas chromatography and chemical methods.

EXAMPLE 2

(Reaction of various olefins with a representative alkyl nitrite in the presence of various representative acid catalysts).

The below listed olefins are reacted in separate glass reaction vessels with methyl nitrite in the presence of the below

TABLE 2

| Olefin (and amount) | Catalyst amount | Amount of methyl nitrite charged, mole | Solvent amount | Temperature (° C.) | Time (hours) | Cleavage product(s) | Addition product(s) |
| --- | --- | --- | --- | --- | --- | --- | --- |
| (0.8 mole) isobutylene | (130 grams) *Amberlyst 15. | 0.6 | Liquid $SO_2$ (300 ml.). | $-10$ | 1.3 | None | $CH_3$<br>$\|$<br>$CH_3-C-CH=NOH$<br>$\|$<br>$O$<br>$\|$<br>$CH_3$ |
| (1.7 moles) 2-methyl-2-butene | (0.1 mole) $BF_3 \cdot (C_2H_5)_2O$ | 1.0 | Methanol (350 ml.) | 22–26 | 3.3 | Acetone, 1,1-dimethoxy ethane. | $CH_3$<br>$\|$<br>$CH_3-C-C-CH_3$<br>$\| \ \|$<br>$O$<br>$\|$<br>$CH_3NOH$ |
| Do | (0.37 mole) $KHSO_4$ | 0.93 | ....do.... | 24–29 | 6.5 | ....do.... | Same as above. |
| Do | (0.13 mole) methylhydrogen sulfate plus (0.27 mole) methyl sodium sulfate. | 1.2 | ....do.... | 25–30 | 1.4 | ....do.... | Do. |
| Do | (0.02 mole) methylhydrogen sulfate plus (0.1 mole) HI. | 0.8 | ....do.... | 23–28 | 2.5 | ....do.... | Do. |
| (0.77 mole) 2,3-dimethyl-2-pentene. | (0.08 mole) methyl hydrogen sulfate. | 1.25 | Methanol (210 ml.). | 27–30 | 4.0 | Acetone, 2-butanone, 2,2-dimethoxy propane, 2,2-dimethoxy butane. | C; methoxy oxime, (structure not known). |
| (3 mole) isobutylene | (0.5 mole) concentrated $H_2SO_4$. | 1.5 | n-Pentane (1,000 ml.) plus methanol (62 ml.) | 25–26 | 1.4 | Acetone, formaldehyde. | $CH_3$<br>$\|$<br>$CH_3-C-CH-NOH$<br>$\|$<br>$O$<br>$\|$<br>$CH_3$ |
| (2.4 moles) 2-methyl-2-butene | (0.02 moles) $BF_3 \cdot (C_2H_5)_2O$. | 1.0 | None | 24 | 6.0 | Acetone, 1,1-dimethoxy ethane. | $CH_3$<br>$\|$<br>$CH_3-C-CH-CH_3$<br>$\| \ \|$<br>$O \ NO$<br>$\|$<br>$CH_3$<br><br>Plus<br>$CH_3$<br>$\|$<br>$CH_3-C-C-CH_3$<br>$\| \ \|$<br>$O \ NOH$<br>$\|$<br>$CH_3$<br>(Major constituent) |

*Amberlyst 15 is a sulfonate polystyrene resin having in its anhydrous state a hydrogen ion concentration of 4.9 meq./gm. of dry resin (0.63 mole $H+$/130 grams).

noted various representative acid catalysts at the below indicated temperatures and time periods at atmospheric pressure using the inert solvents listed below in Table 2, respectively. The respective cleavage products and addition products produced by the respective reactions are listed in Table 2.

EXAMPLE 3

(Effect of different catalysts on the reaction of a typical olefin with a typical alkyl nitrite in the presence of a typical solvent).

The below indicated amounts of 2-methyl-2-butene are reacted at atmospheric pressure with methyl nitrite at the reaction temperatures and for the time periods noted below in Table 3. The percent selectivity (based on 2-methyl-2-butene reacted) to addition products and cleavage products, respectively, for each catalyst is tabulated hereinbelow in Table 3. In each case the reaction is conducted in the presence of approximately 350 milliliters of methanol as inert solvent.

TABLE 3

| Amount of olefin, mole | Amount of alkyl nitrite, mole | Catalyst (mole) | Temperature, °C. | Time (hours) | Percent selectivity to addition | Percent selectivity to cleavage |
|---|---|---|---|---|---|---|
| 1.7 | 2.1 | Methyl hydrogen sulfate (0.13 mole) plus stainless steel strips. | 23–29 | 1.4 | 18 | 82 |
| | 1.2 | Methyl hydrogen sulfate (0.13 mole) plus methyl sodium sulfate (0.27 mole). | 25–30 | 1.4 | 50 | 50 |
| | 1.0 | BF$_3$(C$_2$H$_5$)$_2$O (0.1 mole) | 22–26 | 3.3 | 52 | 48 |
| | 0.93 | KHSO$_4$ (0.37 mole) | 24–29 | 6.5 | 55 | 45 |
| | 0.8 | Methyl hydrogen sulfate (0.02 mole) plus HI (0.1 mole). | 23–28 | 2.5 | 80 | 20 |

The variation of product distribution with catalyst demonstrates that catalyst is one of the controlling variables. The data also indicates that the mechanism involved in the cleavage reaction is probably different from the mechanism operating in the addition reaction. The different mechanisms causing the addition reaction on the one hand and the cleavage reaction on the other hand are presently not known. Further experimentation, wherein reaction products isolated from the methyl nitrite plus 2-methyl-2-butene reaction are reacted with additional methyl nitrite, indicates that the alkoxy oxime (e.g. methoxy oxime) addition product is not an intermediate in the oxidative cleavage reaction. This offers further proof for the belief that the cleavage and additional reactions are independent reactions.

EXAMPLE 4

(Effect of different alkyl nitrites on product distribution viz. selectivity).

Various typical alkyl nitrites (including methyl nitrite produced in situ from N$_2$O$_3$ and methanol) in the below indicated amounts are reacted with 2-methyl-2-butene in the indicated amounts in the presence of the below indicated amounts of methyl hydrogen sulfate. These reactions are conducted at atmospheric pressure in glass reaction vessels. The product distribution along with the other pertinent data for these runs are tabulated below in Table 4.

The behavior of different organic nitrites in effecting different product distributions is rather surprising, and the role played by the organic nitrite in this regard is not fully understood at present.

EXAMPLE 5

(Effect of olefine structure on the distribution of (selectivity to) cleavage and addition products).

Identical amounts of the below listed olefins are reacted separately in glass reactor vessels with methyl nitrite at a temperature ranging from 25° to 35° C. using identical amounts of methyl hydrogen sulfate as catalyst and in the presence of the same amounts of methanol as inert solvent. The respective addition products and cleavage products resulting from these reactions are listed in Table 5 below. Table 5 also lists the percent selectivity to addition and the product selectivity to cleavage, respectively, for each reaction. The percent selectivity reported is the mole percent yield based on olefin reacted with methyl nitrite.

The above data indicate that under comparable reaction conditions the ratio of cleavage versus addition is markedly affected by olefin structure. This is particularly apparent by comparing the results obtained with 2-methyl-2-butene and 2-methyl-2-pentene. 2-methyl-2-butene gives about 50 percent double bond cleavage and 50 percent double bond addition. This compared with 80 percent double bond cleavage and 20 percent double bond addition for 2-methyl-2-pentene; yet the only difference between the two olefins is the presence of an ethyl group in 2-methyl-2-pentene versus a methyl group in 2-methyl-2-butene. The almost complete double bond cleavage obtained with tetra-substituted olefins (Type V olefins) follows the expected pattern for this reaction as tetra-substituted olefins are cleaved essentially quantitatively. In a similar run using 2,3-dimethyl-2-butene, this Type V olefin is also cleaved essentially quantitatively. An interesting point is that approximately 50 percent of the ketone formed during the cleavage of tetra-substituted olefins is isolated in the form of an acetal derivative, e.g. a dimethyl acetal derivative in the case of 2,3-dimethyl-2-butene and 2,3-dimethyl-2-pentene. This represents a new way of making acetal derivatives, e.g. dimethyl acetal derivatives, of simple ketones.

EXAMPLE 6

(Representative inert solvents at different reaction conditions with various catalysts).

TABLE 4

| Alkyl nitrite | | Amount of 2-methyl-2-butene, moles | Catalyst, methyl hydrogen sulfate, moles | Temperature, °C. | Time, hours | Percent selectivity to— | |
|---|---|---|---|---|---|---|---|
| Name | Amount, moles | | | | | Double bond addition | Double bond cleavage |
| Methyl nitrite | [1] 1.2 | 1.7 | 0.13 | 25–30 | 1.4 | 50 | 50 |
| Isopropyl nitrite | [2] 1.0 | 1.7 | 0.13 | 28–30 | 5.0 | 26 | 74 |
| Isoamyl nitrite | [3] 1.0 | 1.7 | 0.13 | 22–30 | 6.0 | 23 | 77 |
| N$_2$O$_3$ plus methanol | [4] 0.58 | 1.0 | 0.09 | 10–32 | 7.0 | 40 | 60 |

[1] 350 ml. methanol as solvent.
[2] 350 ml. isopropanol as solvent.
[3] 350 ml. isoamyl alcohol as solvent.
[4] N$_2$O$_3$ was slowly run into reactor containing 200 ml. methanol, 110 ml. 2-methylbutanol-2 and 10 grams methyl hydrogen sulfate.

TABLE 5

| Olefin | Addition product | Percent selectivity to addition | Cleavage products | Percent selectivity to cleavage |
|---|---|---|---|---|
| 2-methyl-2-butene | $CH_3-\underset{\underset{CH_3}{O}}{C}-\underset{NOH}{C}-CH_3$ (3-methoxy-3-methyl 2-butanone oxime) | 50 | $CH_3-\underset{O}{\overset{\|}{C}}-CH_3$ (acetone) + $CH_3CH(OCH_3)_2$ (1,1-dimethoxy ethane) | 50 |
| 2-methyl-2-pentene | $CH_3-\underset{\underset{CH_3}{O}}{C}-\underset{NOH}{C}-CH_2-CH_3$ *(2-methoxy-2-methyl-3-pentanone oxime) | 20 | $CH_3-\underset{O}{\overset{\|}{C}}-CH_3$ + $CH_2-CH_2-CH(OCH_3)_2$ | 80 |
| 2,3-dimethyl-2-pentene | C₇ methoxy oxime (structure not known). | <10 | (1) $CH_3-\underset{\underset{CH_3}{O}}{C}-CH_3$ + (2) $CH_3-\underset{\underset{CH_3}{O}}{C}-CH_2-CH_3$ + (3) $CH_3-\overset{O}{\overset{\|}{C}}-CH_3$ (2,2-dimethoxy propane) (2,2-dimethoxy butane) (acetone) (4) $CH_3-\overset{O}{\overset{\|}{C}}-CH_2-CH_3$ (methyl ethyl ketone) | >80 |

*This is a new compound identified by chemical analysis and infrared and useful both as a solvent and as a chemical intermediate to form methoxy ketones by reaction of said compound with acidified water (acid hydrolysis). The methoxy ketones thus formed are useful as solvents for nitrocellulose and vinyl and epoxy resins. (¹), (²) mole ratio of (1):(2)=3:1 (³), (⁴) mole ratio (3):(4)=1:3.

In separate glass reaction vessels, the below listed olefins are reacted at atmospheric pressure with the listed alkyl nitrites at the reaction temperatures and for the time periods listed in the presence of the respective catalysts and solvents as noted hereinbelow in Table 6 to produce their corresponding cleavage and addition products.

TABLE 6

| Olefin | Alkyl nitrite | Temperature, (° C.) | Time (hours) | Catalyst | Solvent |
|---|---|---|---|---|---|
| Isobutylene | Methyl nitrite | 20–22 | 5.4 | 65% H₂SO₄ | (No solvent). |
| Do | do | 25–35 | 10.0 | Methyl hydrogen sulfate. | Ethanol. |
| Do | do | –9––12 | 1.2 | do | Liquid SO₂. |
| 2-methyl-2-butene | Isoamyl nitrite | 22–30 | 6.0 | do | Isopentanol. |
| Do | Methyl nitrite | 21–25 | 5.0 | do | n-Pentane (1,000 ml.) plus methanol (62 ml.). |
| Do | do | 25–31 | 2.0 | do | Diethyl ether. |
| Do | Isoamyl nitrite | 20–28 | 3.0 | KHSO₄ | Isoamyl alcohol. |
| 1-methyl-1-cyclopentene | Methyl nitrite | 23–27 | 3.7 | Methyl hydrogen sulfate. | Methanol. |
| 2-methyl-2-butene | Tertiary butyl nitrite | 25–30 | 4.0 | do | tert. Butyl alcohol. |

As will be noted from the wide variety of solvents (including no solvent) listed in Table 6 above, a wide variety of inert solvents can be employed in accordance with this invention.

EXAMPLE 7

(Reaction of a typical cycloalkyl nitrite with a representative olefin).

One mole of cyclohexyl nitrile is added over a two-hour period to a reaction flask containing 2 moles of 2-methyl-2-butene 350 ml. of methanol, and 15 gms. of methyl hydrogen sulfate. The temperature is maintained between 25 to 30°C. After the addition of the cyclohexyl nitrite, the reaction mixture is stirred for an additional 1 hour. The acid is neutralized with sodium methylate and the methanol and any unconverted cyclohexyl nitrite is stripped off under reduced pressure (10 mm.). The residue is extracted with diethyl ether to recover the acetal derivative of acetaldehyde, 1,1-dicyclohexoxy ethane, and 3-cyclohexoxy-3-methyl-2-butanone oxime. Acetone which is present in the methanol strippate is recovered from the methanol as a methanol-acetone azeotrope by distillation. The 3-cyclohexoxy-3-methyl-2-butanone oxime is a new compound which can be used to prepare the corresponding cyclohexoxy methyl ketone by acid hydrolysis of the oxime. The ketone thus formed is useful as a solvent for vinyl and epoxy resins.

EXAMPLE 8

(Reaction of a typical Type IV olefin with an alkyl nitrite) 3-Methyl-2-pentene is reacted with methyl nitrite using the acid catalyst solvent and procedure set forth above in Example 7 (with the exceptions that 3-methyl-2-pentene is used in place of 2-methyl-2-butene and methyl nitrite is used in place of cyclohexyl nitrite). The products from this reaction are methyl ethyl ketone, the dimethyl acetal of acetaldehyde and 3-methoxy-3-methyl-2-pentanone oxime. This oxime is a new compound which can be acid hydrolyzed to yield its corresponding methoxy methyl ketone, which is useful as a solvent for vinyl and epoxy resins.

While the invention has been described with reference to various examples and embodiments, it will be apparent to

What is claimed is:

1. A process which comprises reacting (A) an olefin, having from 4 to about 21 carbon atoms, selected from the group consisting of: acyclic Type II olefins as defined by the following formula:

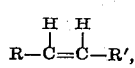

alicyclic Type II olefins as defined by the following formula:

acyclic Type III olefins as defined by the following formula:

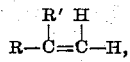

alicyclic Type III olefins as defined by the following formula:

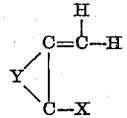

acyclic Type IV olefins as defined by the following formula:

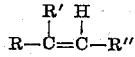

alicyclic Type IV olefins as defined by the following formula:

acyclic Type V olefins as defined by the following formula:

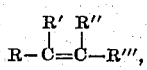

and alicyclic Type V olefins as defined by the following formula:

wherein R, R', R'' and R''' are selected from the group consisting of alkyl, alkenyl, cycloalkyl and cycloalkenyl radicals; wherein X is selected from the group consisting of hydrogen and $C_1$–$C_5$ alkyl radicals; wherein Y is defined by the following formula:

wherein $n$ is an integer in the range of from 3 to about 10 and wherein Q, Z and Z' are selected from the group consisting of hydrogen, a $C_1$ to $C_6$ alkyl radical, $C_1$ to $C_6$ alkenyl radical, $C_5$ to $C_6$ cycloalkyl or $C_5$ to $C_6$ cycloalkenyl radical; with (B) an organic nitrite of the formula: A—ONO, where A is a $C_1$ to $C_6$ radical selected from the group consisting of: alkyl and cycloalkyl radicals, in the presence of 0.1 to 25.0 mole percent of an non-oxidizing acidic reagent based on the organic nitrite employed at temperatures ranging from about $-30°$ to about $250°$ C. and pressures ranging from about 0.1 to 300 atmospheres and recovering (a) carbonyl compounds selected from the group consisting of ketones, aldehydes, ketoaldehydes and acetal derivatives thereof, and (b) alkoxy compounds selected from the group consisting of alkoxy oximino and alkoxy nitroso compounds.

2. A process according to claim 1 wherein said organic nitrite is prepared in situ and wherein said acidic reagent is selected from the group consisting of sulfuric acid, alkyl acid sulfates, and $BF_3·(C_2H_5)_2O$.

3. A process according to claim 2 wherein said organic nitrite is prepared in situ by reacting the corresponding organic alcohol with $N_2O_3$.

4. A process according to claim 2 wherein said olefin is prepared in situ.

5. A process according to claim 2 wherein the olefin is selected from the group consisting of acyclic Type III olefins as defined by the formula:

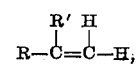

alicyclic Type III olefins as defined by the following formula:

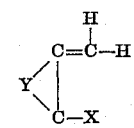

acyclic Type IV olefins as defined by the following formula:

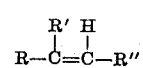

alicyclic Type IV olefins as defined by the following formula:

acyclic Type V olefins as defined by the following formula:

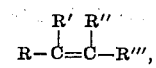

and alicyclic Type V olefins as defined by the following formula:

wherein R, R', R'' and R''' are selected from the group consisting of alkyl, alkenyl, cycloalkyl and cycloalkenyl radicals; wherein X is selected from the group consisting of hydrogen and $C_1$ to $C_5$ alkyl radicals; wherein Y is defined by the following formula:

wherein $n$ is an integer in the range of from 3 to about 10 and wherein Q, Z and Z' are selected from the group consisting of hydrogen, a $C_1$ to $C_6$ alkyl radical, $C_1$ to $C_6$ alkenyl radical, $C_5$ to $C_6$ cycloalkyl or $C_5$ to $C_6$ cycloalkenyl radical; and wherein A is selected from the group consisting of primary, secondary and tertiary $C_1$ to $C_5$ alkyl groups and recovering ketone compounds having at least one carbonyl group.

6. A process according to claim 2 wherein the olefin is selected from the group consisting of acyclic Type II olefins as defined by the following formula:

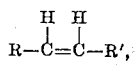

alicyclic Type II olefins as defined by the following formula:

acyclic Type III olefins as defined by the following formula:

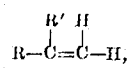

alicyclic Type III olefins as defined by the following formula:

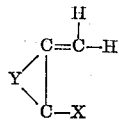

wherein R, R' and R" are selected from the group consisting of alkyl, alkenyl, cycloalkyl and cycloalkenyl radicals; wherein X is selected from the group consisting of hydrogen and $C_1$ to $C_5$ alkyl radicals; wherein Y is defined by the following formula:

$$-(CH)_n-\underset{Q}{|}$$

wherein $n$ is an integer in the range of from 3 to about 10 and wherein Q is selected from the group consisting of hydrogen, a $C_1$ to $C_6$ alkyl radical, $C_1$ to $C_6$ alkenyl radical, $C_5$ to $C_6$ cycloalkyl or $C_5$ to $C_6$ cycloalkenyl radical; acyclic Type IV olefins as defined by the following formula:

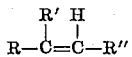

and alicyclic Type IV olefins as defined by the following formula:

and wherein A is selected from the group consisting of primary, secondary and tertiary $C_1$ to $C_5$ alkyl groups and recovering aldehyde compounds having at least one aldehyde group.

7. A process according to claim 2 wherein A is selected from the group consisting of primary, secondary and tertiary $C_1$ to $C_5$ alkyl groups and recovering acetal derivatives of ketone compounds having at least one carbonyl group and aldehyde compounds having at least one aldehyde group.

8. A process according to claim 5 wherein the olefin is selected from the group consisting of acyclic and alicyclic Type III, IV and V olefins and wherein A is selected from the group consisting of primary and secondary $C_1$ to $C_5$ alkyl groups and recovering from the reaction products a compound of the formula selected from the group consisting of:

(1) oximino compounds of the formulas:

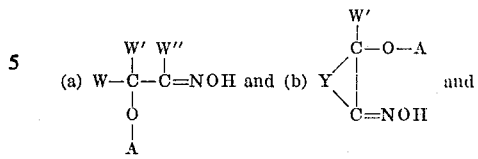

(2) nitroso compounds of the formulas:

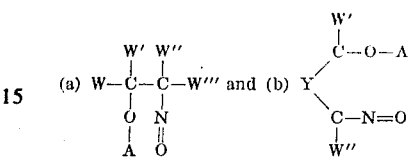

wherein W is a $C_1$ to $C_{12}$ alkyl radical and wherein W', W" and W''' are each selected from the group consisting of hydrogen and $C_1$ to $C_{12}$ alkyl groups; A is an organic radical as defined with respect to said organic nitrite; and Y is an organic radical having the following general formula:

$$-(CH)_n-\underset{Q}{|}$$

wherein $n$ is an integer ranging from 3 to about 10 and wherein Q is a substituent selected from the group consisting of hydrogen, $C_1$ to $C_6$ alkyl, $C_1$ to $C_6$ alkenyl, $C_5$ to $C_6$ cycloalkyl and $C_5$ to $C_6$ cycloalkenyl radicals.

9. A process according to claim 2 which includes recovering from the reaction products an acetal derivative of the formula:

wherein $R_1$ and $R_2$ are each selected from the group consisting of hydrogen and $C_1$ to $C_{12}$ alkyl and ketoalkyl radicals, and A is an organic radical as defined with respect to said organic nitrite.

10. A process according to claim 2 wherein the olefin is selected from the group consisting of isobutylene, octene-2, 2-methyl-2-butene, 1-methyl-1-cyclohexene, 1-methyl-1-cyclopentene, 2-methyl-2-pentene and 2,3-dimethyl-2-pentene.

11. A process according to claim 10 wherein the organic nitrite is selected from the group consisting of methyl nitrite, isopropyl nitrite and isoamyl nitrite.

12. A process according to claim 11 wherein the acid catalyst is selected from the group consisting of methyl hydrogen sulfate, sulfuric acid and $BF_3 \cdot (C_2H_5)_2O$.

13. A process according to claim 12 wherein the reaction is conducted at a temperature ranging from about −15° to 150° C. and at a pressure ranging from 1 to about 50 atmospheres.

14. A process according to claim 8 wherein the acid catalyst is selected from the group consisting of methyl, hydrogen sulfate, sulfuric acid and $BF_3 \cdot (C_2H_5)_2O$.

15. A process according to claim 6 wherein the acid catalyst is selected from the group consisting of methyl, hydrogen sulfate, sulfuric acid and $BF_3 \cdot (C_2H_5)_2O$.

16. A process according to claim 8 wherein the olefin is selected from the group consisting of isobutylene, octene-2, 2-methyl-2-butene, 1-methyl-1-cyclohexene, 1-methyl-1-cyclopentene, 2-methyl-2-pentene and 2,3-dimethyl-2-pentene and wherein the acid catalyst is selected from the group consisting of methyl, hydrogen sulfate, sulfuric acid and $BF_3 \cdot (C_{25})_2O$.

* * * * *